United States Patent
Chopra et al.

(10) Patent No.: US 11,082,492 B2
(45) Date of Patent: Aug. 3, 2021

(54) SYSTEM AND METHOD FOR DYNAMIC BACKUP SESSIONS

(71) Applicant: EMC IP Holding Company LLC, Hopkinton, MA (US)

(72) Inventors: Shelesh Chopra, Bangalore (IN); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 649 days.

(21) Appl. No.: 15/866,546

(22) Filed: Jan. 10, 2018

(65) Prior Publication Data

US 2019/0215365 A1 Jul. 11, 2019

(51) Int. Cl.
*G06F 9/50* (2006.01)
*H04J 1/16* (2006.01)
*H04L 12/24* (2006.01)
*H04L 29/08* (2006.01)
*G06F 3/06* (2006.01)

(52) U.S. Cl.
CPC .......... *H04L 67/1097* (2013.01); *G06F 3/061* (2013.01); *G06F 3/067* (2013.01); *G06F 3/0631* (2013.01); *G06F 3/0635* (2013.01); *H04L 67/1008* (2013.01); *H04L 67/1031* (2013.01); *G06F 3/0653* (2013.01)

(58) Field of Classification Search
None
See application file for complete search history.

(56) References Cited

U.S. PATENT DOCUMENTS

| 7,127,502 B1 * | 10/2006 | Nishikado ........... G06F 16/9574 |
| | | 709/219 |
| 8,554,918 B1 | 10/2013 | Douglis |
| 9,098,525 B1 | 8/2015 | Mandic et al. |
| 9,330,109 B2 | 5/2016 | Bone et al. |
| 9,367,351 B1 * | 6/2016 | Yang .................... G06F 11/349 |
| 9,451,013 B1 | 9/2016 | Roth |
| 9,531,809 B1 | 12/2016 | Brooker |
| 9,740,435 B2 | 8/2017 | Dolce et al. |
| 9,953,075 B1 | 4/2018 | Reiner et al. |

(Continued)

FOREIGN PATENT DOCUMENTS

WO  01/06368 A1  1/2001

OTHER PUBLICATIONS

European Extended Search Report issued in corresponding European Application No. 19169657.4, dated Nov. 27, 2019.

(Continued)

*Primary Examiner* — Nicholas R Taylor
*Assistant Examiner* — Ho T Shiu
(74) *Attorney, Agent, or Firm* — Chamberlain, Hrdlicka, White, Williams & Aughtry

(57) ABSTRACT

An orchestrator for providing storage access via storage gateways includes a persistent storage and a processor. The persistent storage includes a workload policy. The processor obtains a data storage access request from a client, identifies a type of workload indicated by the data storage access request, identifies a storage gateway of the storage gateways to service the storage access request using the workload policy and the identified type of workload, and assigns the identified storage gateway to provide the client with storage access.

20 Claims, 16 Drawing Sheets

(56) References Cited

U.S. PATENT DOCUMENTS

| | | |
|---|---|---|
| 9,977,704 B1 | 5/2018 | Chopra et al. |
| 10,089,148 B1 | 10/2018 | Blitzer et al. |
| 10,180,912 B1 | 1/2019 | Franklin et al. |
| 2005/0033756 A1 | 2/2005 | Kottomtharayil et al. |
| 2006/0224852 A1 | 10/2006 | Kottomtharayil |
| 2008/0025230 A1* | 1/2008 | Patel ................... H04L 41/5022 370/252 |
| 2009/0260021 A1 | 10/2009 | Haenel |
| 2011/0137870 A1 | 6/2011 | Feder et al. |
| 2011/0314069 A1 | 12/2011 | Klatorre et al. |
| 2012/0059934 A1* | 3/2012 | Rafig ................... H04L 67/1002 709/225 |
| 2012/0278569 A1 | 11/2012 | Kawakami et al. |
| 2012/0331248 A1 | 12/2012 | Kono et al. |
| 2013/0138649 A1 | 5/2013 | Broberg |
| 2013/0290627 A1 | 10/2013 | Nazari et al. |
| 2014/0082167 A1 | 3/2014 | Robinson |
| 2014/0281301 A1 | 9/2014 | Reinoso et al. |
| 2014/0297950 A1 | 10/2014 | Kuwayama |
| 2014/0380014 A1 | 12/2014 | Moyer |
| 2015/0016405 A1* | 1/2015 | Maxwell ............. H04W 72/048 370/329 |
| 2015/0106468 A1* | 4/2015 | Kobayashi ........... H04L 41/082 709/212 |
| 2015/0154418 A1 | 6/2015 | Redberg |
| 2015/0205528 A1 | 7/2015 | Hyde, II et al. |
| 2015/0261468 A1 | 9/2015 | Khoyi et al. |
| 2016/0054922 A1 | 2/2016 | Awasthi et al. |
| 2016/0062779 A1 | 3/2016 | Tsirkin |
| 2016/0062795 A1* | 3/2016 | Hu ........................ H04L 47/805 718/104 |
| 2016/0085574 A1 | 3/2016 | Dornemann et al. |
| 2017/0060695 A1 | 3/2017 | Clare |
| 2017/0093976 A1 | 3/2017 | Raghunath et al. |
| 2017/0168729 A1* | 6/2017 | Faulkner ............... G06F 3/0631 |
| 2017/0302555 A1 | 10/2017 | Weinman |
| 2017/0351426 A1 | 12/2017 | Anderson et al. |
| 2018/0188989 A1 | 7/2018 | Nachimuthu et al. |
| 2018/0267830 A1 | 9/2018 | Rivera et al. |
| 2018/0314429 A1 | 11/2018 | Thomas |
| 2019/0235922 A1 | 8/2019 | Iovanna et al. |
| 2019/0245794 A1 | 8/2019 | Kalman et al. |

OTHER PUBLICATIONS

European Extended Search Report issued in corresponding EP Application No. 19150826.6, dated Apr. 5, 2019.

Gregory Collier et al.; "Virtualization's Next Frontier: Security"; In Proceedings of the 35th Annual ACM SIGUCCS Fall Conference (SIGUCCS '07); pp. 34-36; 2007.

* cited by examiner

SYSTEM AND METHOD FOR DYNAMIC BACKUP SESSIONS

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, an orchestrator for providing storage access via storage gateways in accordance with one or more embodiments of the invention includes a persistent storage and a processor. The persistent storage includes a workload policy. The processor obtains a data storage access request from a client, identifies a type of workload indicated by the data storage access request, identifies a storage gateway of storage gateways to service the storage access request using the workload policy and the identified type of workload, and assigns the identified storage gateway to provide the client with storage access.

In one aspect, a method of operating an orchestrator for providing storage access via storage gateways in accordance with one or more embodiments of the invention includes obtaining, by the orchestrator, a data storage access request from a client. The method includes identifying, by the orchestrator, a type of workload indicated by the data storage access request. The method includes identifying, by the orchestrator, a storage gateway of the storage gateways to service the storage access request using a workload policy and the identified type of workload. The method includes assigning, by the orchestrator, the identified storage gateway to provide the client with storage access.

In one aspect, a non-transitory computer readable medium in accordance with one or more embodiments of the invention includes computer readable program code, which when executed by a computer processor enables the computer processor to perform a method for operating an orchestrator for providing storage access via storage gateways, the method includes obtaining, by the orchestrator, a data storage access request from a client. The method includes identifying, by the orchestrator, a type of workload indicated by the data storage access request. The method includes identifying, by the orchestrator, a storage gateway of the storage gateways to service the storage access request using a workload policy and the identified type of workload. The method includes assigning, by the orchestrator, the identified storage gateway to provide the client with storage access.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. More specifically, the systems, devices, and methods may dynamically modify the number of concurrent sessions and/or cache behavior of a storage gateway. Modifying the storage gateway dynamically may enable the storage gateway to provide data management services to clients while meeting quality of service goals.

In one or more embodiments of the invention, the storage gateway provides data management services to client by utilizing a number of storages. In other words, the storage gateway may store data from the clients in a number of storages to provide data management services to the client.

In one or more embodiments of the invention, the storage gateway may be modified based on the type of client workload, the connections between the storage gateway and the storages, and/or the available computing resources of the storage gateway.

As used herein, computing resources refer to processor computing cycles, communication bandwidth, transitory storage input-output cycles, persistent storage input-output cycles, and/or transitory or persistent memory storage capacity. Transitory storage may be provided by, for example, random access memory. Persistent storage memory may be provided by, for example, a solid state hard disk drive. Processor computing cycles may be provided by, for example, a central processing unit. Communication bandwidth may be provided by, for example, a network interface card.

Figure 1A:
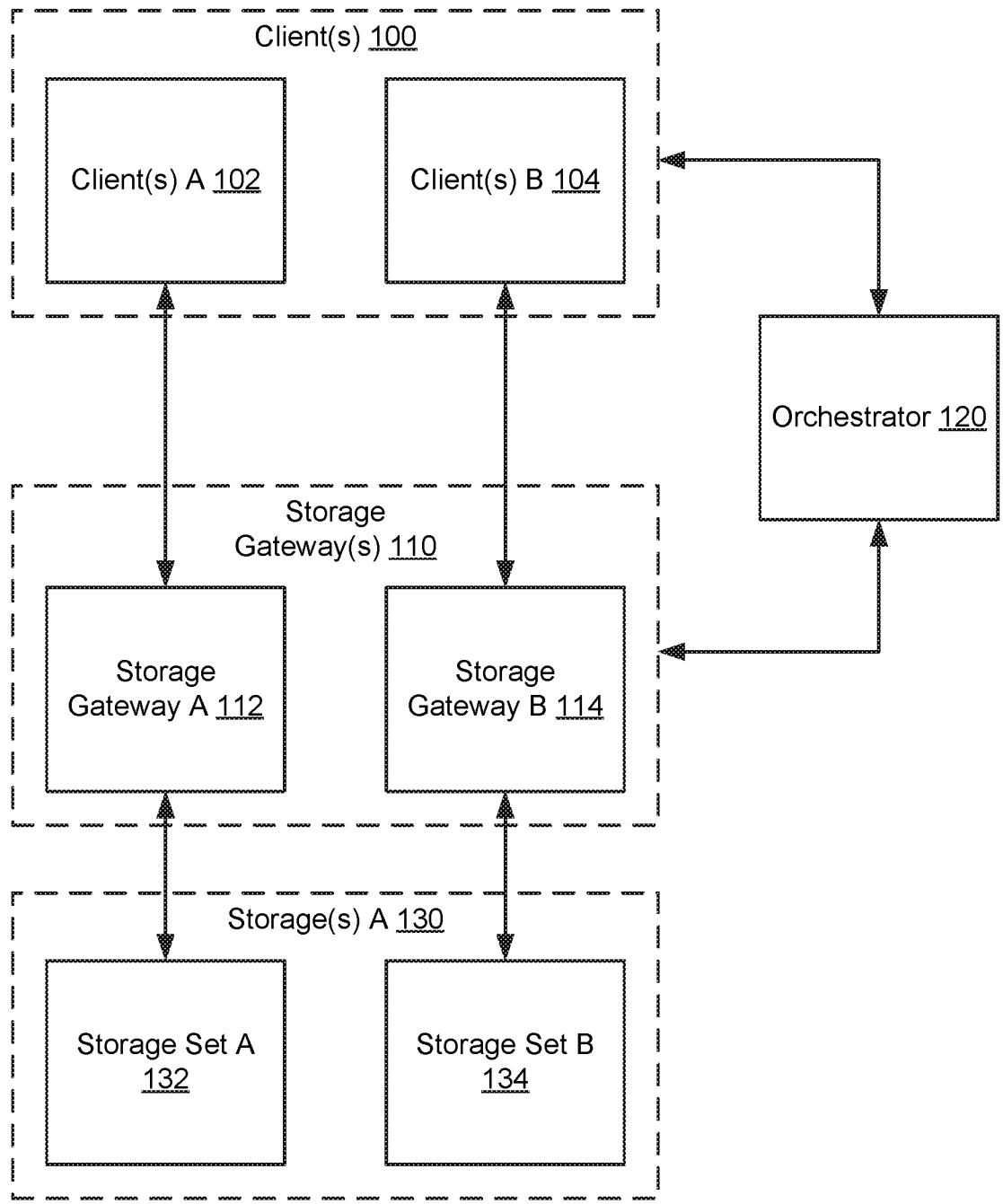
FIG. 1A shows a diagram of a system in accordance with one or more embodiments of the invention.

FIG. 1A shows an example system in accordance with one or more embodiments of the invention. The system may include client(s) (100), storage gateways (110) that manage client data, an orchestrator (120) that assigns individual clients (102, 104) to individual storage gateways (112, 114), and storages (130) that store the data from the clients (100). The clients (100), storage gateways (110), orchestrator (120), and storages (130) may be operably connected to each other. The connection may be, for example, a network connection. Each component of the system is discussed below.

The clients (100) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and perform the method illustrated in FIG. 5. The clients (100) may be other types of computing devices without departing from the invention.

The clients (100) may be programmed to store data in the storages (130) via the storage gateways (110). By storing data in the storages, the clients (100) may store backup copies of data and/or reduce the storage utilization rate of the clients.

In one or more embodiments of the invention, the clients (100) store a copy of all or a portion of the respective client's data in the storages (130) via the storage gateways (110). In other words, the storage gateways (110) may be used as to back up the client's data.

In one or more embodiments of the invention, the clients (100) store data in the storages (130) via the storage gateways (110). In other words, rather than storing data to a local storage, the clients (100) may store data in the storages (130) via the storage gateways (110) without making a local copy of the stored data.

In one or more embodiments of the invention, each client may be assigned to store data in the storages (130) via a single storage gateway. Each client may receive a respective assignment from the orchestrator (120). After assignment, each client may continue to store data to the storages (130) using the assigned storage gateway. In one or more embodiments of the invention, the clients may perform the method illustrated in FIG. 5 to obtain an assignment and store/obtain data from storages using the assignment.

While the clients (102, 104) are illustrated as being assigned to separate storage gateways (110), multiple clients may be assigned to the same storage gateway without departing from the invention. However, assigning multiple clients to the same cloud gateway may reduce a quality of service provided to the clients assigned to the storage gateway. For example, the processes of storing or providing data to/from the storages may consume computing resources of the storage gateways. As will be discussed in greater detail below, the orchestrator may assign clients to be serviced by different storage gateways to maintain a quality of service provided by the storage gateways.

As discussed above, the clients (100) may store data in the storages via the storage gateways (110). The storage gateways (110) may be computing devices. The computing devices may be, for example, mobile phones, tablet computers, laptop computers, desktop computers, servers, distributed computing systems, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The storage gateways (110) may be other types of computing devices without departing from the invention.

In one or more embodiments of the invention, the storage gateways (110) may be a distributed computing device. As used herein, a distributed computing device refers to functionality provided by a logical device that utilizes the computing resources of one or more separate and/or distinct computing devices. For example, in one or more embodiments of the invention, the storage gateways (110) may be a distributed device that includes components distributed across a number of separate and/or distinct computing devices. In such a scenario, the functionality of the storage gateways (110) may be performed by multiple different computing devices without departing from the invention.

The storage gateways (110) may manage client data. The storage gateways (110) may manage client data by receiving requests to store or obtain data from the clients (100). In response to the requests, the storage gateways (110) may take appropriate action to service the aforementioned storage/access requests from the clients. For additional details regarding the storage gateways, See FIG. 1C.

While the storage gateways (112, 114) are illustrated as being operably connected to separate storage sets (132, 134), multiple storage gateways may be operably connected to any combination of shared and separate storages without departing from the invention. For additional details regarding the connections between storage gateways (110) and storage sets (132, 134) of the storages (130), See FIGS. 2E-2F.

As discussed above, the storage gateways (110) may manage client data by storing it in the storages (130). The storages (130) may be computing devices. The computing devices may be, for example, mobile phones, tablet computers, laptop computers, desktop computers, servers, distributed computing systems, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The storages (130) may be other types of computing devices without departing from the invention.

In one or more embodiments of the invention, the storages (130) may be distributed computing devices. As used herein, a distributed computing device refers to functionality provided by a logical device that utilizes the computing resources of one or more separate and/or distinct computing devices. For example, in one or more embodiments of the invention, the storages (130) may be a distributed devices that include components distributed across a number of separate and/or distinct computing devices. In such a scenario, the functionality of the storages (130) may be performed by multiple different computing devices without departing from the invention.

The storages (130) may store client data or provide previously stored client data. The storages (130) may store or provide client data in response to requests from the storage gateways (110). In response to the requests, the storages (130) may take appropriate action to service the aforementioned storage/access requests from the storage gateways. For additional details regarding the storages (130), See FIG. 1F.

While the storage sets (132, 134) are illustrated as being operably connected to separate storage gateways (112, 114), multiple storage sets may be operably connected to any combination of storage gateways without departing from the invention. In other words, storage sets may provide storage services for any number of storage gateways.

As discussed above, the storage gateways (110) may manage client. To maintain a quality of service to the clients (100), the orchestrator (120) may assign clients to different storage gateways (110). The orchestrator (120) may be a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and the methods illustrated in FIGS. 4A-4D. The orchestrator (120) may be other types of computing devices without departing from the invention.

In one or more embodiments of the invention, the orchestrator (120) may be a distributed computing device. For example, the orchestrator (120) may be a distributed device that includes components distributed across a number of separate and/or distinct computing devices. In such a scenario, the functionality of the orchestrator (120) may be performed by multiple different computing devices without departing from the invention.

The orchestrator (120) may assign clients to be serviced by storage gateways (110). The orchestrator (120) may make the assignments to maintain a quality of service provided by the storage gateways (110) to the clients (100). The orchestrator (120) may make the assignments based on a set of rules that take into account one or more of: (i) the current and/or future workload of the client, (ii) characteristics of the connection between storages utilized by the storage gateways (110) when providing services to the clients (100), and the availability of computing resources of the storage gateways (110). The set of rules may take into account additional, different, or fewer factors without departing from the invention. For additional details regarding the orchestrator (120), See FIG. 1B.

Figure 1B:
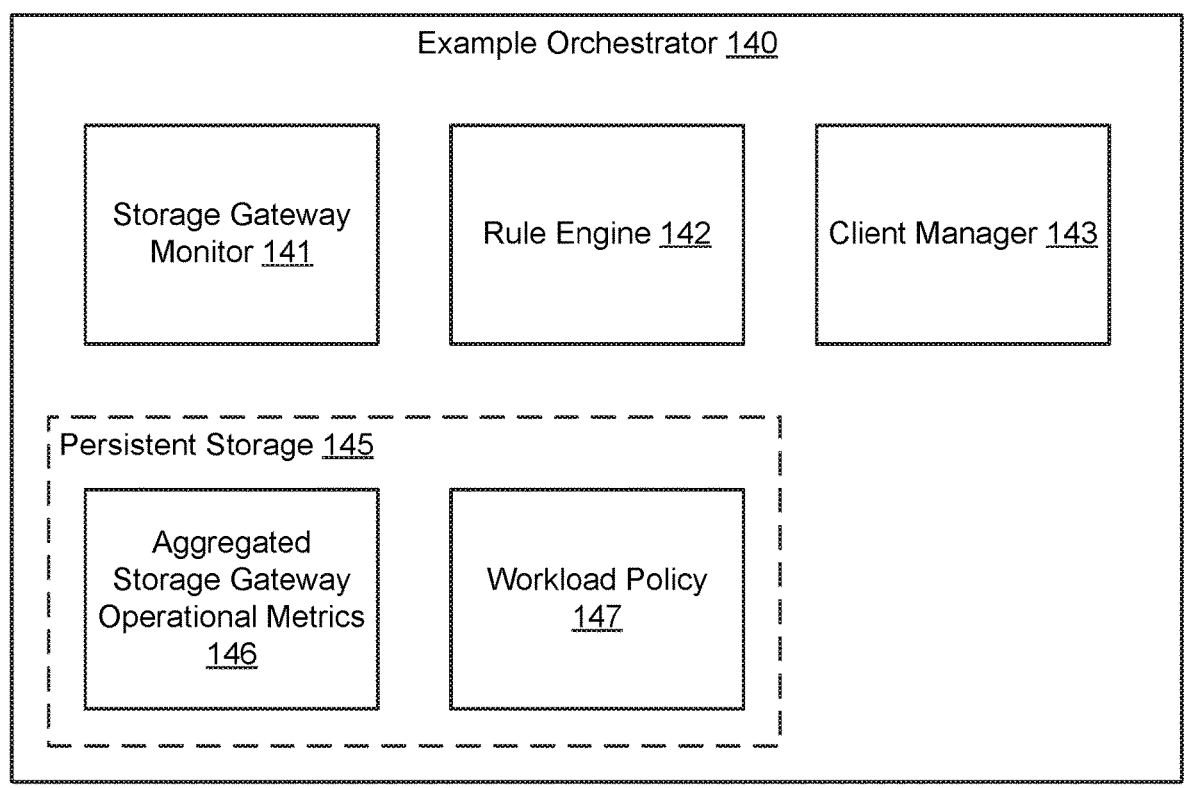
FIG. 1B shows a diagram of an example orchestrator in accordance with one or more embodiments of the invention.
Figure 1C:
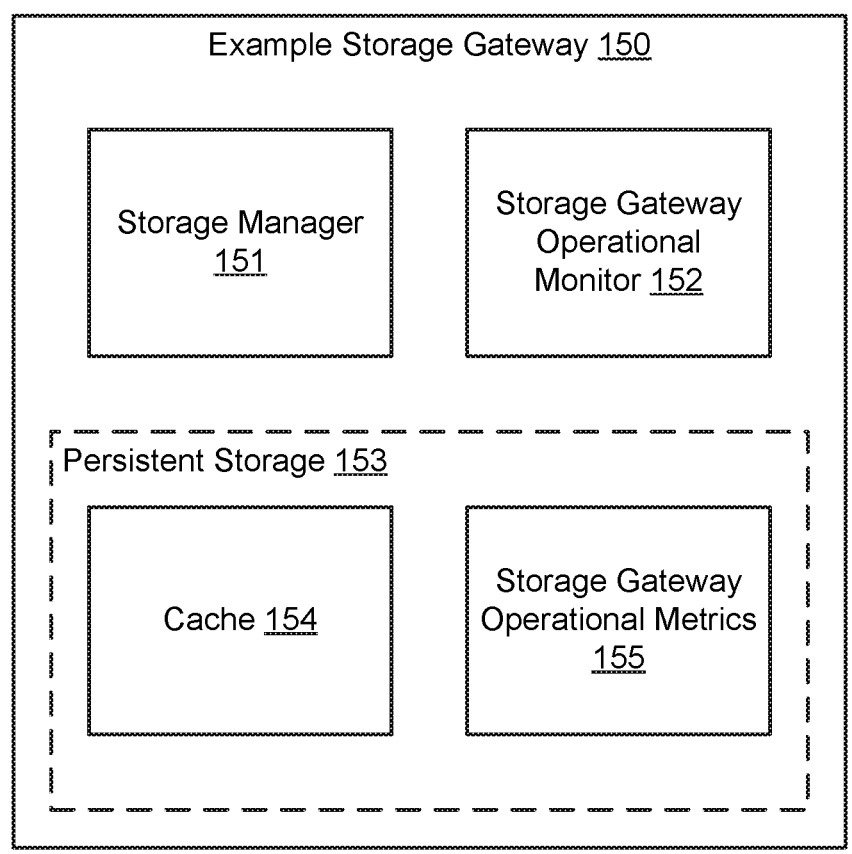
FIG. 1C shows a diagram of an example storage gateway in accordance with one or more embodiments of the invention.
Figure 1D:
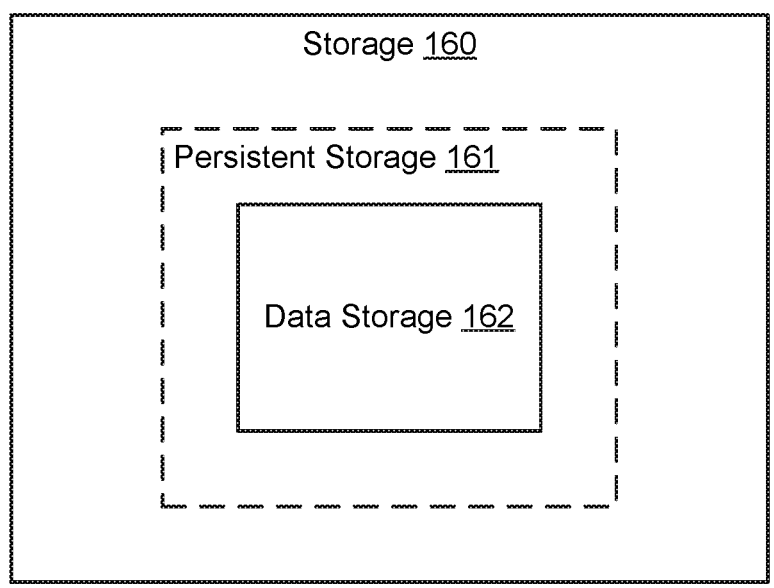
FIG. 1D shows a diagram of an example storage in accordance with one or more embodiments of the invention.

To further explain the operation of components of the systems, FIGS. 1B-1D show diagrams of individual components of the system of FIG. 1A. While these diagrams illustrate portions of the components of the system, each of the components of the system may include additional, fewer, or different portions without departing from the invention.

FIG. 1B shows an example orchestrator (140) in accordance with one or more embodiments of the invention. The example orchestrator (140) may provide the same functionality as the orchestrator illustrated in FIG. 1A. As described with respect to FIG. 1A, the example orchestrator (140) may assign clients to storage gateways for service. To provide the aforementioned functionality, the orchestrator may include a storage gateway monitor (141), a rule engine (142), a client manager (143), and a persistent storage (145). Each component of the example orchestrator (140) is described below.

In one or more embodiments of the invention, the storage gateway monitor (141) obtains storage gateway operational metrics and aggregates the aforementioned metrics. The aggregated metrics may be stored on a persistent storage (145). As will be discussed in greater detail below, the rule engine (142) may utilize the aggregated metrics when assisting the client manager (143) in making client assignments.

In one or more embodiments of the invention, the storage gateway monitor (141) may be implemented as a circuit. For example, storage gateway monitor (141) may be implemented as a field programmable gate array, application integrated circuit, digital signal processor, or analog circuit. The storage gateway monitor (141) may be implemented as other types of circuit without departing from the invention.

In one or more embodiments of the invention, the storage gateway monitor (141) may be implemented as computer readable instructions stored on a non-transitory computer readable storage medium being executed by a processor. The computer readable instructions may cause the processor to perform the aforementioned functions of the storage gateway monitor (141).

The rule engine (142) may assist the client manager (143) in assigning clients to storage gateways. As discussed above, assigning clients to storage gateways may reduce a quality of service provided by the storage gateways. To meet a quality of service requirement for the storage gateways, the client manager (143) may request that the rule engine (142) make a determination regarding whether assigning a particular client to a storage gateway would negatively impact the quality of service provided by the cloud storage gateway.

In one or more embodiments of the invention, the rule engine (142) makes a determination based on a set of rule. The set of rules may specify a determination based on one or more of the following: (i) the type of workload the particular client will impose a storage gateway, (ii) the mode of the imposed workload, (iii) characteristics of the connection between the client and the storage(s) that the cloud gateway will utilize to store client data, (iv) characteristics of the storage the storage gateway will utilize to store the client data, and (v) the cache size of the storage gateway. The determination may specify the number of concurrent sessions for the type of workload that the client will impose on the storage gateway that will negatively impact the quality of service provided by the storage gateway. In one or more embodiments of the invention, the rule engine (142) may make a determination based on fewer factors such as, for example, an example workload policy (230). For additional details regarding a workload policy, See FIG. 2D.

In one or more embodiments of the invention, the type of workload the client will impose specifies a classification of the files that the client will be storing via the storage gateway. The classification may be one or more of the following: (a) a database, (b) unstructured data, and (c) file system backup. The classification may be classified based on additional categories without departing from the invention. Each classification may impose a different level of workload on the storage gateway. For example, a client that stores a database in a storage via a cloud gateway may impose a larger workload due to the frequency of changes to the database. In contrast, storing a backup of a file system may impose a smaller workload on the cloud gateway. Thus, by classifying different types of workloads, the rule engine may provide accurate estimates of the ability of the cloud gateways to maintain a quality of service to the clients.

In one or more embodiments of the invention, the mode of the imposed workload specifies whether the data stored by the client will be maintained synchronously with corresponding data stored by the client or asynchronously with corresponding data stored by the client. Synchronous and asynchronous modes may impose different workloads on the storage gateway. For example, a client that operates in a synchronous mode may send changes to data frequently to the storage gateway. In contrast, asynchronous modes may send changes less frequently to the storage gateway. Thus, by classifying clients based on the modes of operation, the rule engine may provide accurate estimates of the ability of the cloud gateways to maintain a quality of service to the clients.

In one or more embodiments of the invention, the characteristics of the connection may specify the bandwidth and/or latency between a client and the storages that a storage gateway will use to service client storage needs. By classifying clients based on the characteristics of the connections between the clients and the storages, the rule engine may determine whether the storage gateway is able to provide a quality of service to the client.

In one or more embodiments of the invention, the characteristics of the storage specify a type of data structure and/or space saving mechanism utilized by the storage. The type of data structure and/or space saving mechanism utilized by the storage may control the rate at which stored data may be obtained from the storage. For example, a storage may utilize deduplication to save space at the cost increasing the time required to obtain stored data from the storage. By classifying storages based on the characteristics of the storages, the rule engine may determine whether the storage gateway is able to provide a quality of service to the client. For simplicity, different types of storages that utilizes different types of data structures and/or space saving mechanisms may be classified into categories represented by letters, e.g., A, B, C, etc. Each category may represent the relative amount of time used by the storages that the storage gateway utilizes to store client data to store or provide client data stored in the storages.

In one or more embodiments of the invention, the characteristics of the cache size specify a quantity of cache available to the storage gateway. The cache size of the storage gateway may impact the ability of the storage gateway to store/obtain data to/from storages. By classifying storage gateways based on the cache size, the rule engine may determine whether the storage gateway is able to provide a quality of service to the client.

To further clarify the operation of the rule engine (142), an example set of rules is provided and applied to five storage gateways below in Table 1. In Table 1, the first seven columns represent examples of factors on which the rule engine makes a determination regarding the maximum number of streams and an identifier of a corresponding storage gateway. The eighth column represents the determination of the rule engine for the respective storage gateway which specifies that maximum number of concurrent sessions, i.e., the number of clients that may be assigned to the storage gateway, for the respective client workload that the storage gateway may be assigned before a quality of service of the storage gateway is reduced.

TABLE 1

Example set of rules applied by Rule engine (142)

| Client Workload | Storage Gateway ID | Storage Characteristics | Mode | Cache | Bandwidth | Latency | Determination |
|---|---|---|---|---|---|---|---|
| Database | CB1 | A | Sync | 1 TB | 200 Mbps | <200 ms | <=20 |
| Database | CB2 | B | Sync | 0.1 TB | 1 Gbps | <1 ms | <=256 |
| Unstructured | CB3 | A | aSync | 0.1 TB | 8 Gbps | <1 ms | <=1024 |
| Backup | CB4 | A | Sync | 1 TB | 100 Mbps | <400 ms | <=10 |
| Database | CB5 | C | aSync | 0.5 TB | 1 Gbps | <1 ms | <=512 |

As seen in row 1 of Table 1, the storage gateway with identifier CB1 may be concurrently assigned up to 20 client for servicing database workloads. In other words, up to 20 clients that wish to store database files in the CB1 storage gateway may be assigned without negatively impacting the quality of service provided by the storage gateway to the assigned clients.

In contrast, as seen in row 2 of Table 1, the storage gateway with identifier CB2 may be concurrently assigned up to 256 client for servicing database workloads. In other words, up to 256 clients that wish to store database files in the CB2 storage gateway may be assigned without negatively impacting the quality of service provided by the storage gateway to the assigned clients. CB2 has a connection with a much higher bandwidth and, therefore, is able to support more concurrent sessions without reducing the provided quality of service.

Similar differences are seen in the CB3-CB5 storage gateway devices. In other words, the rules engine specifies different number of allowable concurrent sessions.

In one or more embodiments of the invention, the rule engine (142) may be implemented as a circuit. For example, rule engine (142) may be implemented as a field programmable gate array, application integrated circuit, digital signal processor, or analog circuit. The rule engine (142) may be implemented as other types of circuit without departing from the invention.

In one or more embodiments of the invention, the rule engine (142) may be implemented as computer readable instructions stored on a non-transitory computer readable storage medium being executed by a processor. The computer readable instructions may cause the processor to perform the aforementioned functions of the rule engine (142).

As discussed above, the client manager (143) may assign clients to storage gateways using determinations made by the rule engine (142). When a client attempts to store data via a storage gateway, the client may first notify the client manager (143) of the storage request. In response, the client manager (143) may request a determination from the rule engine (142) regarding a potential assignment, e.g., potentially assigning the client to a particular storage gateway. In response to the request, the rule engine (142) provides the client manager (143) with a determination. If the determination indicates that the potential assignment would reduce the quality of service provided by particular storage gateway, the client manager (143) may not assign the client to the particular storage gateway and may send another request for a determination regarding a second potential storage gateway. The client manager (143) may continue to perform the aforementioned process until a determination is made that the assignment will not negatively impact a quality of service provided by a storage gateway. The client manager (143) may assign the client to the storage gateway that will be able to service the client without negatively impacting the quality of service provided by the storage gateway.

In one or more embodiments of the invention, the client manager (143) may be implemented as a circuit. For example, client manager (143) may be implemented as a field programmable gate array, application integrated circuit, digital signal processor, or analog circuit. The client manager (143) may be implemented as other types of circuit without departing from the invention.

In one or more embodiments of the invention, the client manager (143) may be implemented as computer readable instructions stored on a non-transitory computer readable storage medium being executed by a processor. The computer readable instructions may cause the processor to perform the aforementioned functions of the client manager (143).

As discussed above, the storage gateway monitor (141) and rule engine (142) may utilize data structures stored in a persistent storage (145). The persistent storage (145) may be a physical device. The physical device may be, for example, a solid state hard drive, a disk drive, a tape drive, or other non-transitory storage medium. In some embodiments of the invention, the persistent storage (145) may be a logical device that utilizes the physical computing resources of one or more other devices to provide data storage functionality. For example, the persistent storage (145) may be a logical storage that utilizes the physical storage capacity of disk drives of multiple, separate computing devices.

The persistent storage (145) may store aggregated storage gateway operational metrics (146) and/or workload policy (147). The persistent storage (145) may store additional, different, or less data without departing from the invention.

In one or more embodiments of the invention, the aggregated storage gateway operational metrics (146) may be a data structure stored in the persistent storage (145). The data structure may include information gathered by the storage gateway monitor (141) and/or other components of the example orchestrator (140). The aggregated storage gateway operational metrics (146) may be used by the rule engine (142) to make a determination regarding a potential storage gateway for servicing a particular client. For additional details regarding the aggregated storage gateway operational metrics (146), See FIG. 2A.

In one or more embodiments of the invention, the workload policy (147) may be a data structure stored in the persistent storage (145). The data structure may include information used by the rule engine (142) to make determinations regarding the assignment of clients to potential storage gateways. For additional details regarding the workload policy (147), See FIG. 2D.

Once assigned by the orchestrator, storage gateways may provide storage services to clients assigned to the respective storage gateway. The storage services include storage of client data and providing of previously stored client data.

FIG. 1C shows an example storage gateway (150) in accordance with one or more embodiments of the invention. To provide the aforementioned storage services and enable an orchestrator to make determinations regarding the example storage gateway (150), the example storage gateway (150) may include a storage manager (151), a storage gateway operational monitor (152), and a persistent storage (153). Each component of the example storage gateway (150) is discussed below.

In one or more embodiments of the invention, the storage manager (151) services data storage/access requests from clients. To service the requests, the storage manager (151) may store data in a cache (154) implemented in a persistent storage (153) and/or storages that are operably connected to the storage manager. Similarly, the storage manager (151) may retrieve data in the cache (154) and/or the storages that are operably connected to the storages. In one or more embodiments of the invention, the storages are separate, e.g., part of a different device, from the example storage gateway (150).

In one or more embodiments of the invention, the cache (154) may store copies of a portion of the client data stored in the storages. The storage manager (151) may preferentially retrieve copies of client data stored in the cache (154) when servicing client request rather than retrieving copies of the client data stored in the storages.

In one or more embodiments of the invention, the storage manager (151) may be implemented as a circuit. For example, storage manager (151) may be implemented as a field programmable gate array, application integrated circuit, digital signal processor, or analog circuit. The storage manager (151) may be implemented as other types of circuit without departing from the invention.

In one or more embodiments of the invention, the storage manager (151) may be implemented as computer readable instructions stored on a non-transitory computer readable storage medium being executed by a processor. The computer readable instructions may cause the processor to perform the aforementioned functions of the storage manager (151).

In one or more embodiments of the invention, the storage gateway operational monitor (152) stores data regarding the operation of the example storage gateway (150) as storage gateway operational metrics (155) in a persistent storage (153). The storage gateway operational monitor (152) may monitor the operation of the example storage gateway (150) and update the storage gateway operational metrics (155) continuously, periodically, at any schedule of fixed time intervals, and/or in response to requests from an orchestrator. The updates may be performed using different scheduling scenarios without departing from the invention.

In one or more embodiments of the invention, the storage gateway operational monitor (152) may be implemented as a circuit. For example, storage gateway operational monitor (152) may be implemented as a field programmable gate array, application integrated circuit, digital signal processor, or analog circuit. The storage gateway operational monitor (152) may be implemented as other types of circuit without departing from the invention.

In one or more embodiments of the invention, the storage gateway operational monitor (152) may be implemented as computer readable instructions stored on a non-transitory computer readable storage medium being executed by a processor. The computer readable instructions may cause the processor to perform the aforementioned functions of the storage gateway operational monitor (152).

The persistent storage (153) may be a physical device. The physical device may be, for example, a solid state hard drive, a disk drive, a tape drive, or other non-transitory storage medium. In some embodiments of the invention, the persistent storage (153) may be a logical device that utilizes the physical computing resources of one or more other devices to provide data storage functionality. For example, the persistent storage (153) may be a logical storage that utilizes the physical storage capacity of disk drives of multiple, separate computing devices.

The persistent storage (153) may store a cache (154) and/or storage gateway operational metrics (155). The persistent storage (153) may store additional, different, or less data without departing from the invention.

In one or more embodiments of the invention, the cache (154) is a data structure stored in the persistent storage (153). The data structure may include copies of client data stored in the storages. In some cases, client data may be first stored in the cache (154) and copies of the client data may be subsequently stored in the storages. Portions of the client data in the cache may be deleted and thereby result in a copy of only a portion of a client's data stored in the storages being maintained in the cache (154).

In one or more embodiments of the invention, the storage gateway operational metrics (155) may be a data structure stored in the persistent storage (153). The data structure may include information used by an orchestrator to make a determination regarding potentially assigning a client to the storage gateway. The storage gateway operational metrics (155) may be aggregated by an orchestrator with similar data from any number of other example storage gateways (150). For additional details regarding aggregated storage gateway operational metrics, See FIGS. 2A-2C.

Figure 1E:
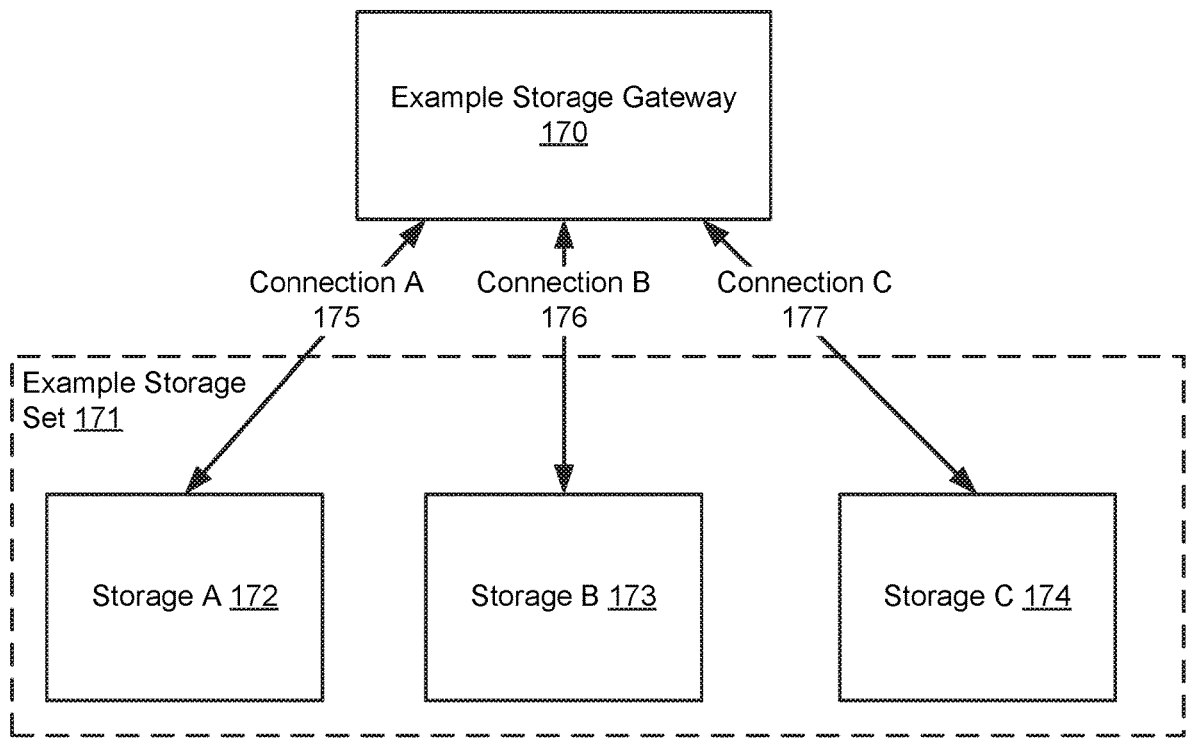
FIG. 1E shows a diagram of a first example topology in accordance with one or more embodiments of the invention.
Figure 1F:
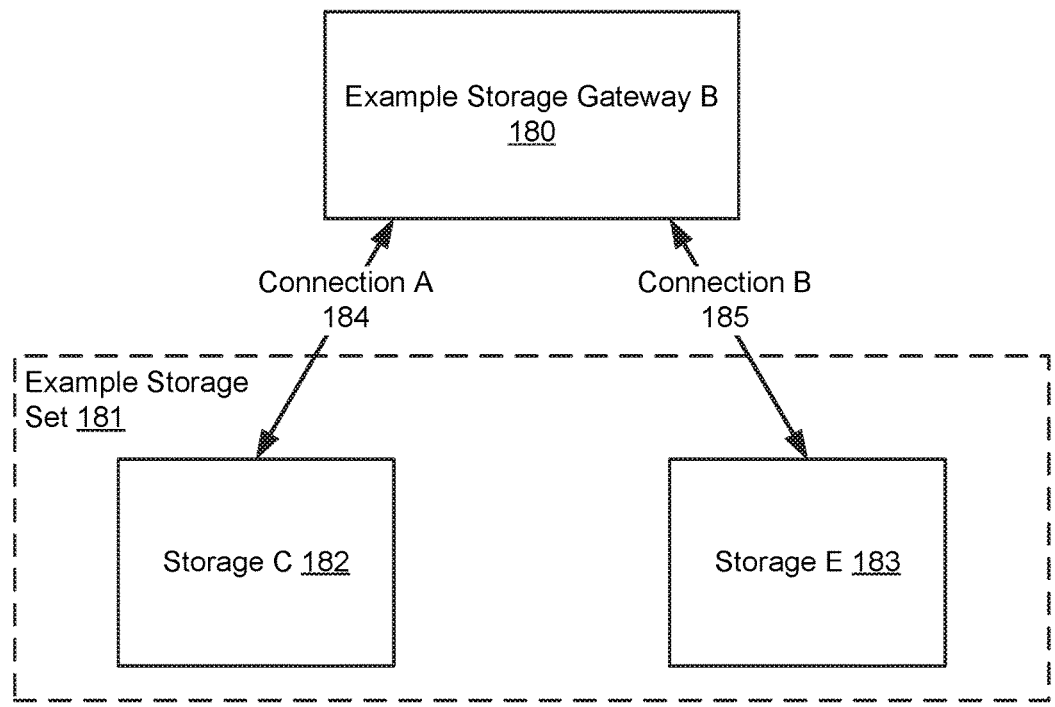
FIG. 1F shows a diagram of a second example topology in accordance with one or more embodiments of the invention.

As discussed above, to service client storage/access requests the storage gateway may utilize storages. The storages may be separate devices operably connected to the storage gateway. Each storage gateway may be connected to any number of storages. FIGS. 1E and 1F show example of storage gateway and storage topologies.

FIG. 1E shows a diagram of a first example storage topology. The first example storage topology includes an example storage gateway (170) operably connected to a storage set (171). The example storage gateway (170) is connected to storages (172, 173, 174) of the storage set through respective operable connections (175, 176, 177).

FIG. 1F shows a diagram of a second example storage topology. The second example storage topology includes an example storage gateway (180) operably connected to a storage set (181). The example storage gateway (180) is connected to two storages (182, 183) of the storage set (181) through respective operable connections (184, 185).

As seen from FIGS. 1E and 1F, different storage sets may include different storages and/or the same storages. For example, the storage set (181) of FIG. 1F includes a storage C (182) also used by the storage set (171) of FIG. 1E. While the storage sets are illustrated as including a limited number of storages, storage sets may include any number of storages without departing from the invention. Additionally, while each storage is illustrated as being connected to respective storage gateways (170, 180) through separate connections, the connections between the respective storage gateways and storage sets may take on any form, my utilize the same or different connections, and may be implemented using any combination of wired and/or wireless communication technologies without departing from the invention.

As discussed above, storage gateways may utilizes storages to provide client with data storage/access services. Each of the respective storages may provide different levels of services or similar levels of service for storing/access client data.

FIG. 1D shows an example storage (160) in accordance with one or more embodiments of the invention. The example storage (160) may store data from storage gateways or provide stored data to storage gateways in response to requests from the storage gateways.

In one or more embodiments of the invention, the example storage (160) includes a persistent storage (161). The persistent storage (161) may be a physical device. The physical device may be, for example, a solid state hard drive, a disk drive, a tape drive, or other non-transitory storage medium. In some embodiments of the invention, the persistent storage (161) may be a logical device that utilizes the physical computing resources of one or more other devices to provide data storage functionality. For example, the persistent storage (161) may be a logical storage that utilizes the physical storage capacity of disk drives of multiple, separate computing devices.

In one or more embodiments of the invention, the persistent storage (161) stores a data storage (162). The data storage (162) may be a data structure for storing client data. In other words, the example storage (160) may store client data in the data storage (162).

In one or more embodiments of the invention, the data storage (162) may deduplicate the client data before storage. In other words, the data storage (162) may deduplicate the data against data stored in the data storage (162) before the client data is stored in the data storage (162).

As used herein, a deduplicated storage refers to a storage that attempts to reduce the required amount of storage space to store data by not storing multiple copies of the same files or bit patterns located near the storage location of the data within a storage when the data is first stored in the storage. A deduplicated storage balances the input-output (IO) limits of the physical devices used to implement the storage stored against the benefit of reduced storage space requirements by only comparing the to-be-stored data to a portion of all of the data stored in the object storage.

To deduplicate data, the to-be-stored data may be broken down into segments. The segments may correspond to portions of the to-be-stored data. Fingerprints that identify each segment of the to-be-stored data may be generated. The generated fingerprints may be compared to a portion of pre-existing fingerprints associated with a portion of the data already stored in the storage. Any segments of the to-be-stored data that do not match a fingerprint of the portion of the data already stored in the storage may be stored in the storage, the other segments are not stored in the storage. A file recipe to generate the now-stored data may be generated and stored so that the now-stored data may be retrieved from the storage. The recipe may include information that enables all of the segments of the to-be-stored data that were stored in the storage and all of the segments of the data already stored in the object storage having fingerprints that matched the fingerprints of the segments of the to-be-stored data to be retrieved from the object storage.

As used herein, a fingerprint may be a bit sequence that virtually uniquely identifies a segment. As used herein, virtually uniquely means that the probability of collision between each fingerprint of two segments that include different data is negligible, compared to the probability of other unavoidable causes of fatal errors. In one or more embodiments of the invention, the probability is 10^-20 or less. In one or more embodiments of the invention, the unavoidable fatal error may be caused by a force of nature such as, for example, a tornado. In other words, the fingerprint of any two segments that specify different data will virtually always be different.

In one or more embodiments of the invention, a fingerprint of a bit sequence is generated by obtaining a hash of the bit sequence. The hash may be generated using, for example, secure hashing algorithm (SHA) 1. Other hashing algorithms may be used without departing from the invention.

The process of deduplication of data, discussed above, utilizes computing resources including processing cycles, storage IO, and/or network communications bandwidth. Multiple clients may attempt to store data in the data management device and thereby consume all available computing resources resulting in a reduced quality of service offered by the storage device which, in turn, reduces the quality of service provided by storage gateways to clients. Embodiments of the invention may improve the quality of storage service by proactively assigning clients to storage gateways to prevent storages from reducing their quality of service due to oversubscription.

To further clarify embodiments of the invention, diagrams of data structures used by the system shown in FIG. 1A are illustrated in FIGS. 2A-2D.

Figure 2A:
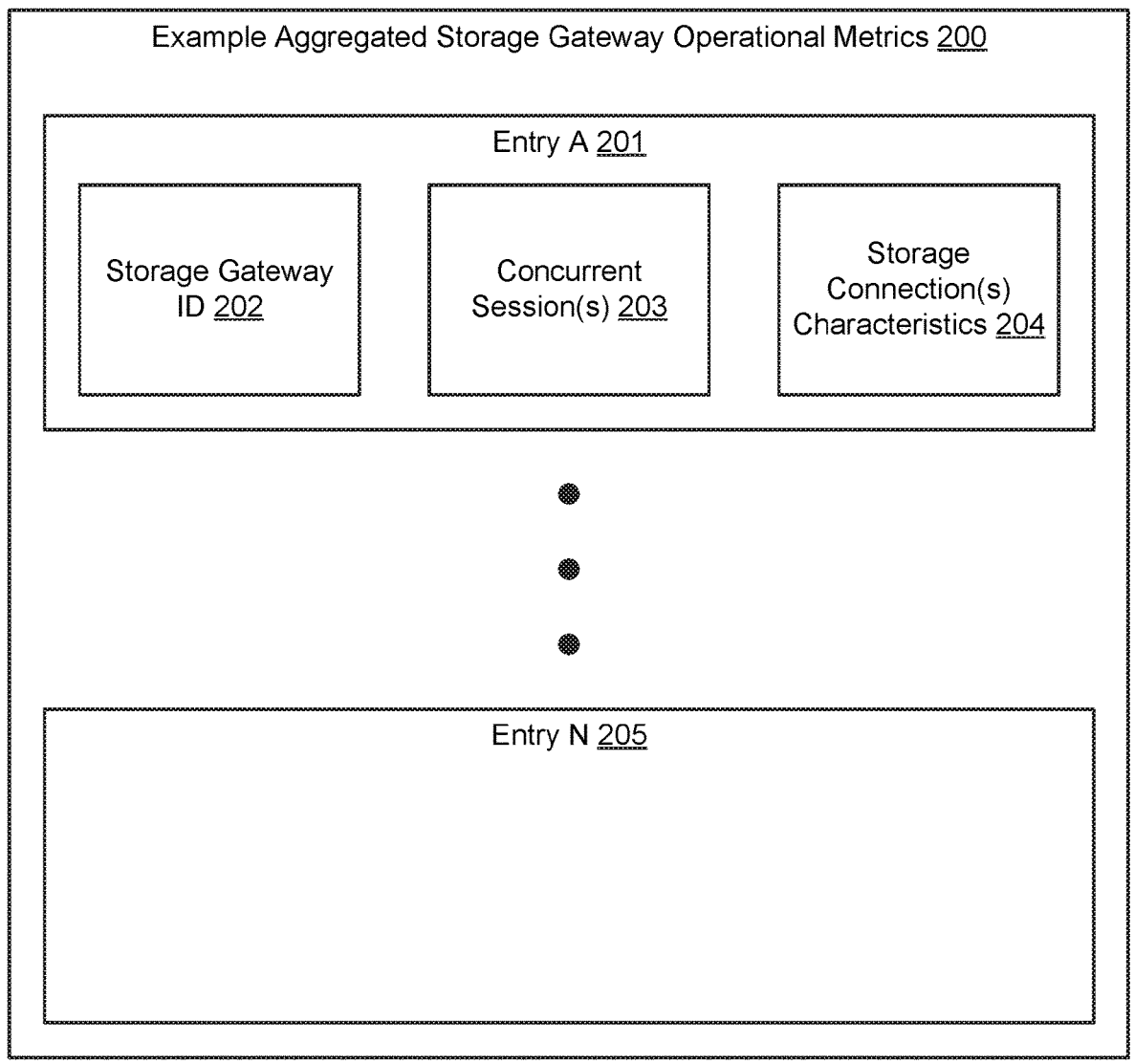
FIG. 2A shows a diagram of an example of aggregated storage gateway operational metrics in accordance with one or more embodiments of the invention.

FIG. 2A shows an example aggregate storage gateway operation metrics (200) in accordance with one or more embodiments of the invention. The aforementioned metrics may be utilized by an orchestrator when assigning clients to storage gateways.

The example aggregate storage gateway operation metrics (200) may include entries (201, 205) associated with storage gateways. Each entry (201, 205) may include a storage gateway identifier (202), a number of concurrent sessions (203) hosted by the storage gateway identified by the storage gateway identifier (202), and storage connection characteristics (204) between clients and storages utilized by the storage gateway identifier by the storage gateway identifier (202) to provide storage services to the clients.

Figure 2B:
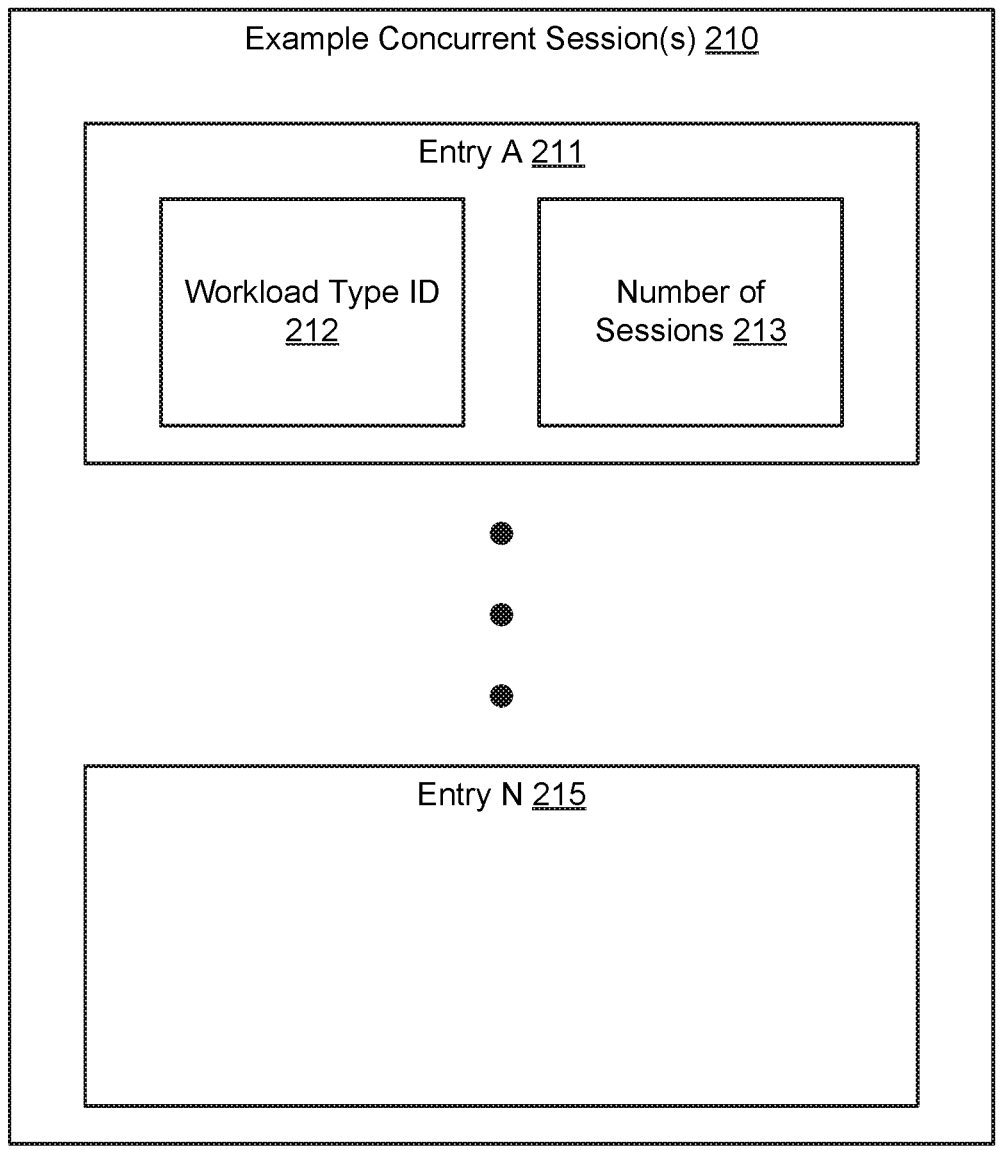
FIG. 2B shows a diagram of an example of concurrent session in accordance with one or more embodiments of the invention.

FIG. 2B shows an example concurrent sessions (210) in accordance with one or more embodiments of the invention. The example concurrent sessions (210) may be utilized by an orchestrator when assigning clients to storage gateways.

The example concurrent sessions (210) may include entries (211, 215) associated with a particular storage gateway. Each entry (211, 215) may include a workload type identifier (212) that identifies of type of workload imposed on the particular storage gateway by clients assigned to the particular storage gateway and a number of sessions (213) that specifies the number of session in which the workload identified by the workload type identifier is being performed. Each entry may specify different workload type identifiers and the number of sessions in which the workload type is being performed.

Figure 2C:
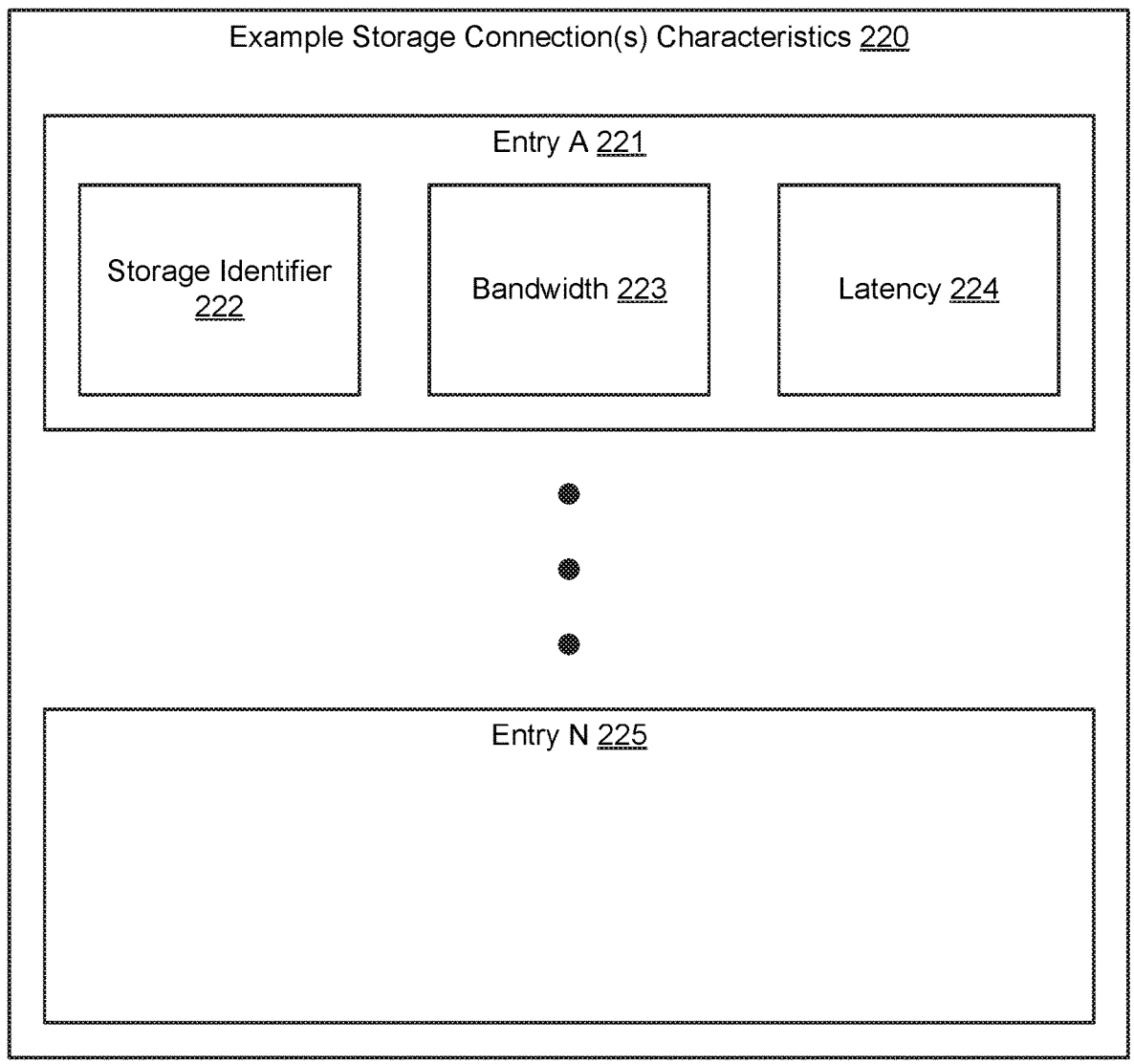
FIG. 2C shows a diagram of an example of storage connection characteristics in accordance with one or more embodiments of the invention.

FIG. 2C shows an example connection characteristics (220) in accordance with one or more embodiments of the invention. The example connection characteristics (220) may be utilized by an orchestrator when assigning clients to storage gateways.

The example connection characteristics (220) may include entries (221, 225) associated with a particular storage gateway. Each entry (221, 225) may include a storage identifier (222) that identifies a storage connected to the particular storage gateway, bandwidth (223) that specifies the bandwidth of the connection between the particular storage gateway and the storage identified by the storage identifier (222), and latency (224) that specifies the latency of the connection between the particular storage gateway and the storage identified by the storage identifier (222). Each entry may specify different storage identifiers and characteristics of the respective connections between the identified storages and the particular storage gateway.

Figure 2D:
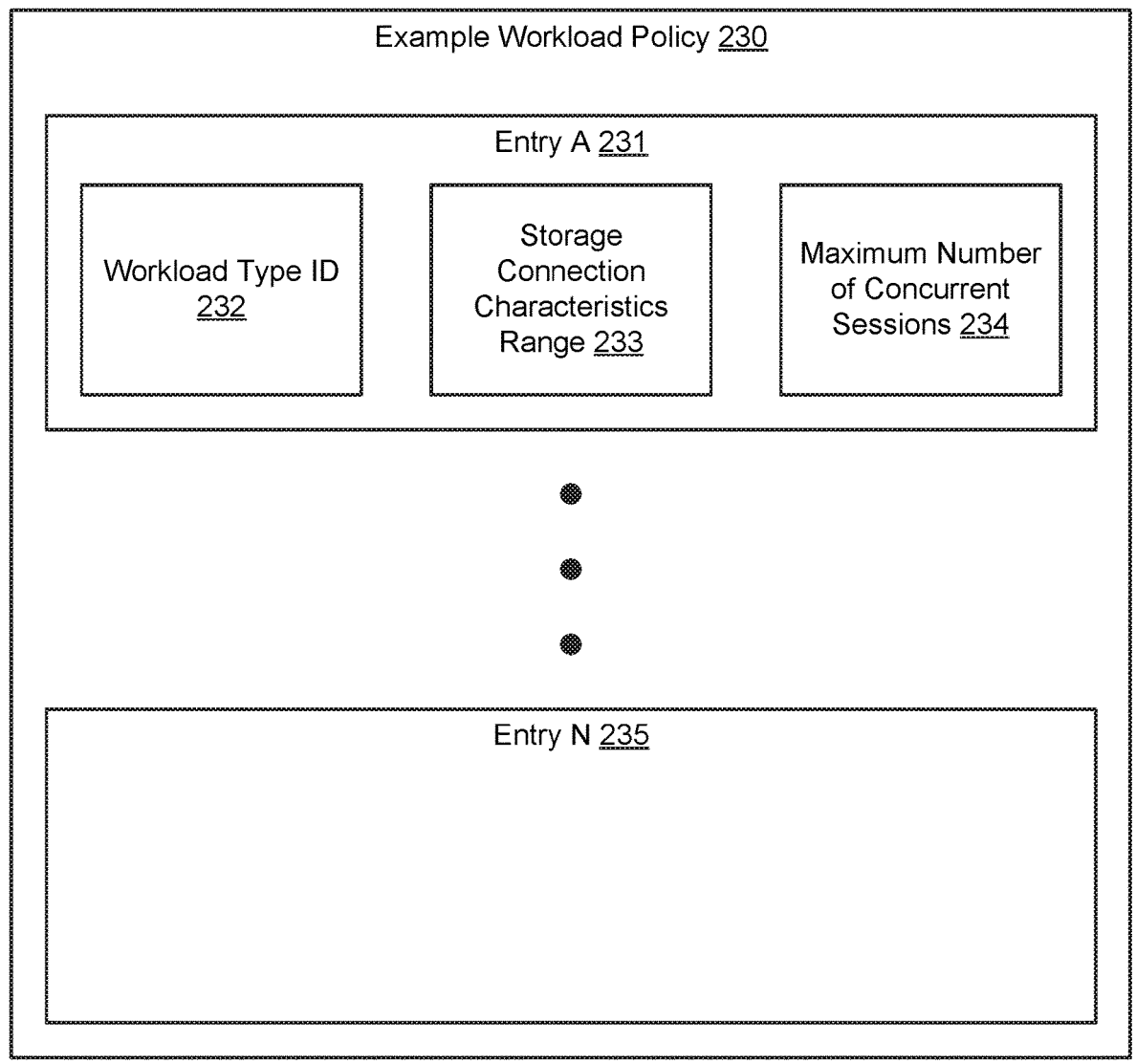
FIG. 2D shows a diagram of an example workload policy in accordance with one or more embodiments of the invention.

FIG. 2D shows an example workload policy (230) in accordance with one or more embodiments of the invention. The example workload policy (230) may be utilized by an orchestrator when assigning clients to storage gateways.

The example workload policy (230) may include entries (231, 235) associated with a different types of workloads. Each entry (231, 235) may include a workload type identifier (232) that identifies a type of workload associated with the entry, a storage connection characteristics range (233), and a maximum number of concurrent sessions (234). The maximum number of concurrent sessions (234) may specify the maximum number of sessions for a workload of: (i) a type specified by the workload type identifier (232) and (ii) a storage gateway having storage connection characteristics in the range specified by the storage connection characteristics range (233). The orchestrator may utilize the workload policy by matching a workload and connection characteristics of a connection between a storage gateway and a storage to an entry. The maximum number of concurrent sessions (234) of the entry may specify the maximum number of concurrent session the storage gateway may perform before a provided quality of service is reduced.

Figure 3:
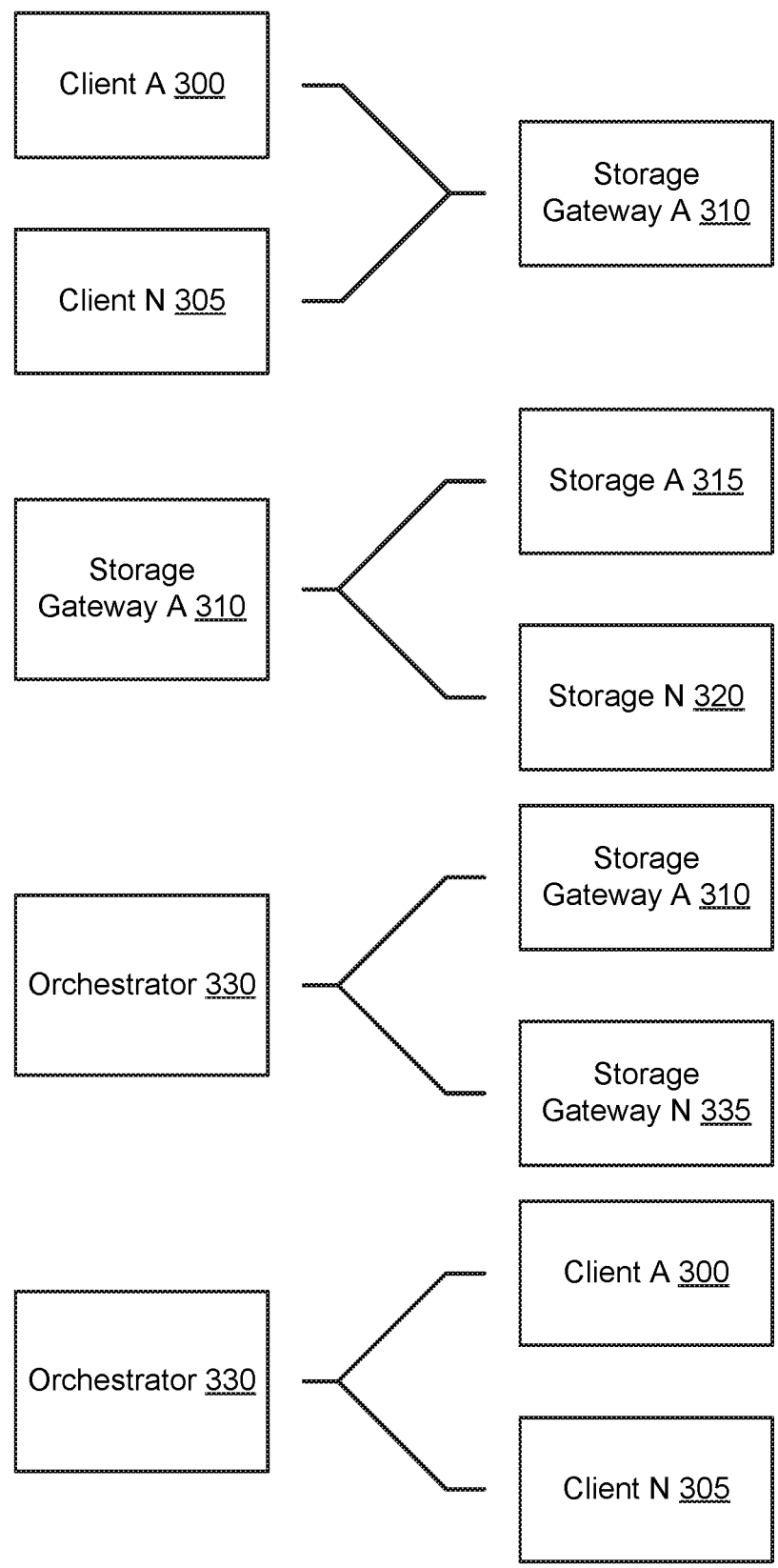
FIG. 3 shows a diagram of system relationships in accordance with one or more embodiments of the invention.

To further clarify relationships between components of the system of FIG. 1A, FIG. 3 shows a relationship diagram. As seen from the diagram, any number of clients (300, 305) may be assigned to be served by a storage gateway (310), e.g., an N to one relationship. Similarly, a storage gateway (310) may utilize any number of storages (315, 320), e.g., a one to N relationship. Similarly, an orchestrator (330) may assign clients to any number of storage gateways (310, 335), e.g., a one to N relationship. Similarly, an orchestrator (330) may assign any number of clients (300, 305), e.g., a one to N relationship.

As discussed above, the orchestrator (120, FIG. 1A) may assign clients to storage gateways (110). FIGS. 4A-4D show methods in accordance with one or more embodiments of the invention to perform the assignments.

While illustrated as separate methods, each of the methods illustrated in FIGS. 4A-4D may be performed sequentially or in parallel (or a combination of both serial and parallel execution) without departing from the invention. Further, one of ordinary skill will appreciate that some or all of these steps may be executed in different orders, may be combined or omitted, and some or all of the steps may be executed in parallel.

Figure 4A:
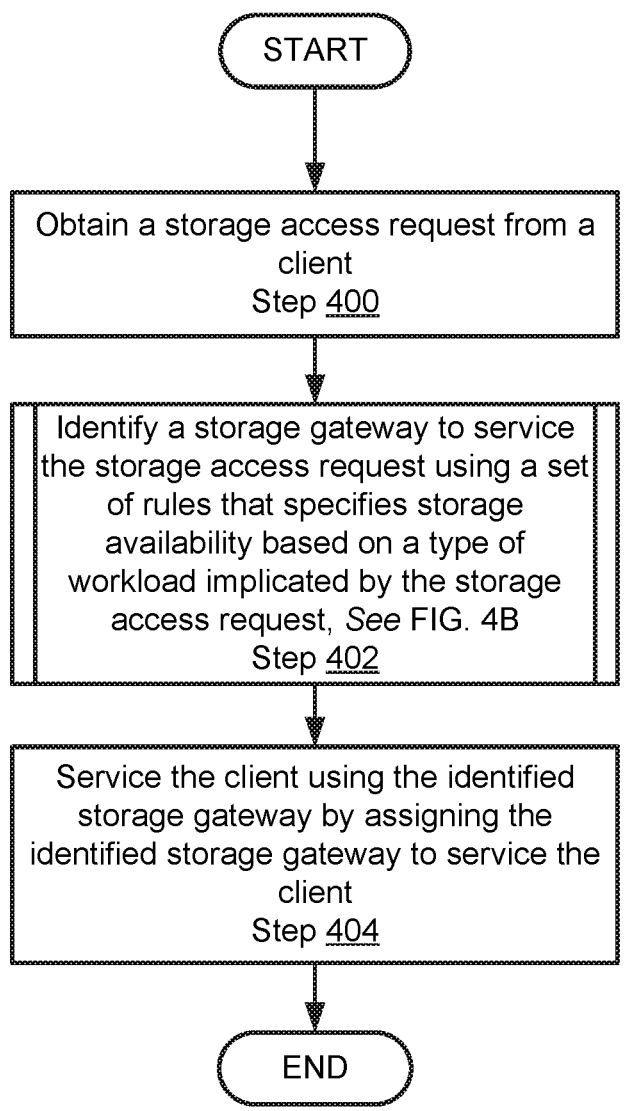
FIG. 4A shows a flowchart of a method of servicing a client in accordance with one or more embodiments of the invention.

FIG. 4A shows a flowchart of a method in accordance with one or more embodiments of the invention. The method depicted in FIG. 4A may be used to service clients in accordance with one or more embodiments of the invention. The method shown in FIG. 4A may be performed by, for example, an orchestrator (120, FIG. 1A). Other component of the system illustrated in FIG. 1A may perform the method of FIG. 4A without departing from the invention.

In Step 400, a storage access request is obtained from a client. As used herein, a storage access request refers to a request for storing data or a request for obtaining stored data.

In one or more embodiments of the invention, the storage access request may be obtained in a message from the client sent via a network. In one or more embodiments of the invention, the storage access request may specify a type of workload that will be imposed on a storage gateway assigned to service a client. The workload may specify a type of data structure that the client will be storing via the storage gateway.

In Step 402, a storage gateway is identified to service the client that sent the storage access request using a set of rules that specifies storage availability based on a type of workload implicated by the storage access request.

Figure 4B:
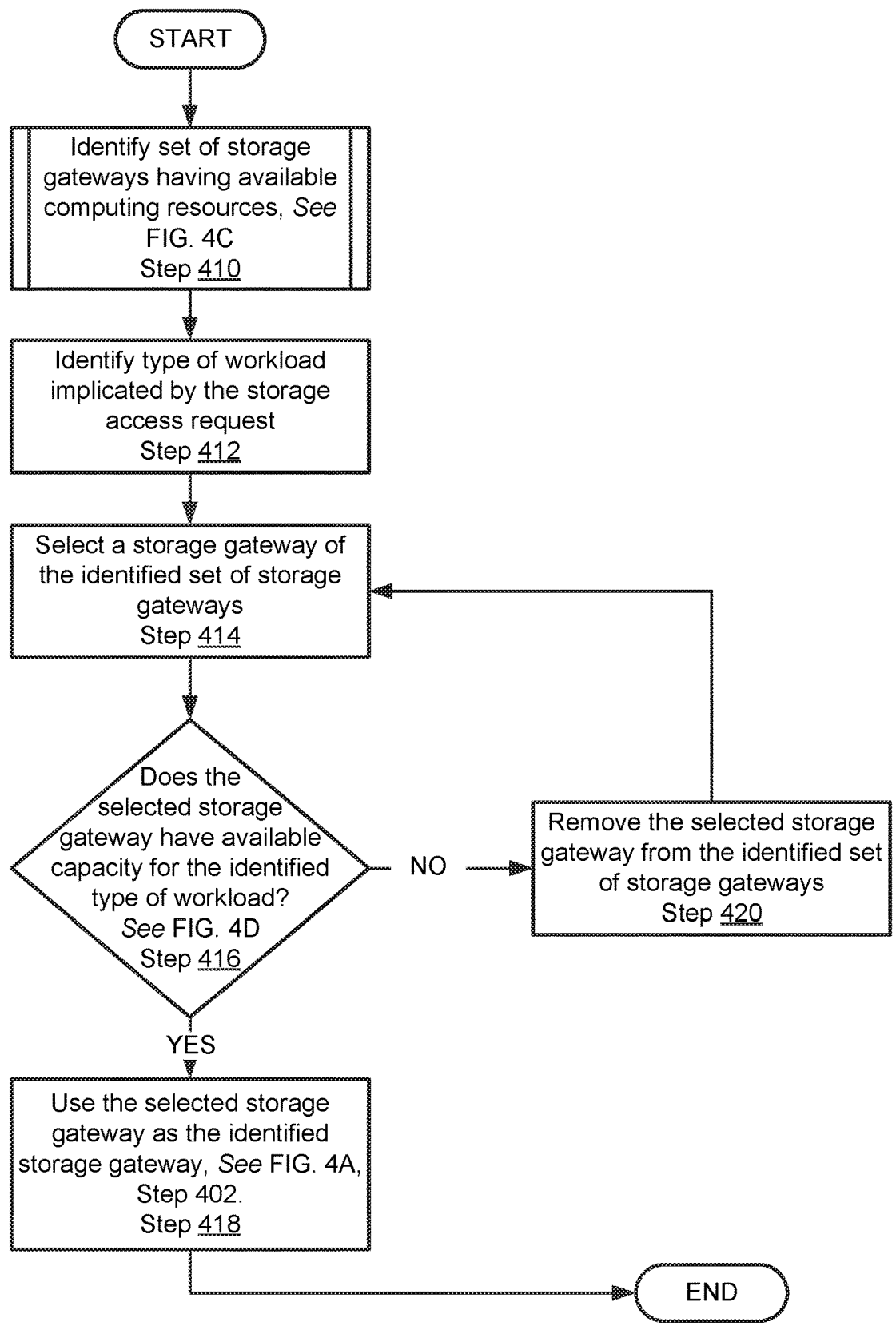
FIG. 4B shows a flowchart of a method of identifying a storage gateway in accordance with one or more embodiments of the invention.

In one or more embodiments of the invention, the storage gateway is identified via the method shown in FIG. 4B. The storage gateway may be identified using the set of rules via other methods without departing from the invention.

In Step 404, the client is serviced using the identified storage gateway. The client may be serviced by the identified storage gateway by assigning the identified storage gateway to service the client.

In one or more embodiments of the invention, the identified storage gateway services the client by storing files from the client in storages and/or provides data to the client from the storages.

The method may end following Step 404.

FIG. 4B shows a flowchart of a method in accordance with one or more embodiments of the invention. The method depicted in FIG. 4B may be used to identify a storage gateway in accordance with one or more embodiments of the invention. The method shown in FIG. 4B may be performed by, for example, an orchestrator (120, FIG. 1A). Other component of the system illustrated in FIG. 1A may perform the method of FIG. 4B without departing from the invention.

In Step 410, a set of storage gateways having available computing resources is identified.

Figure 4C:
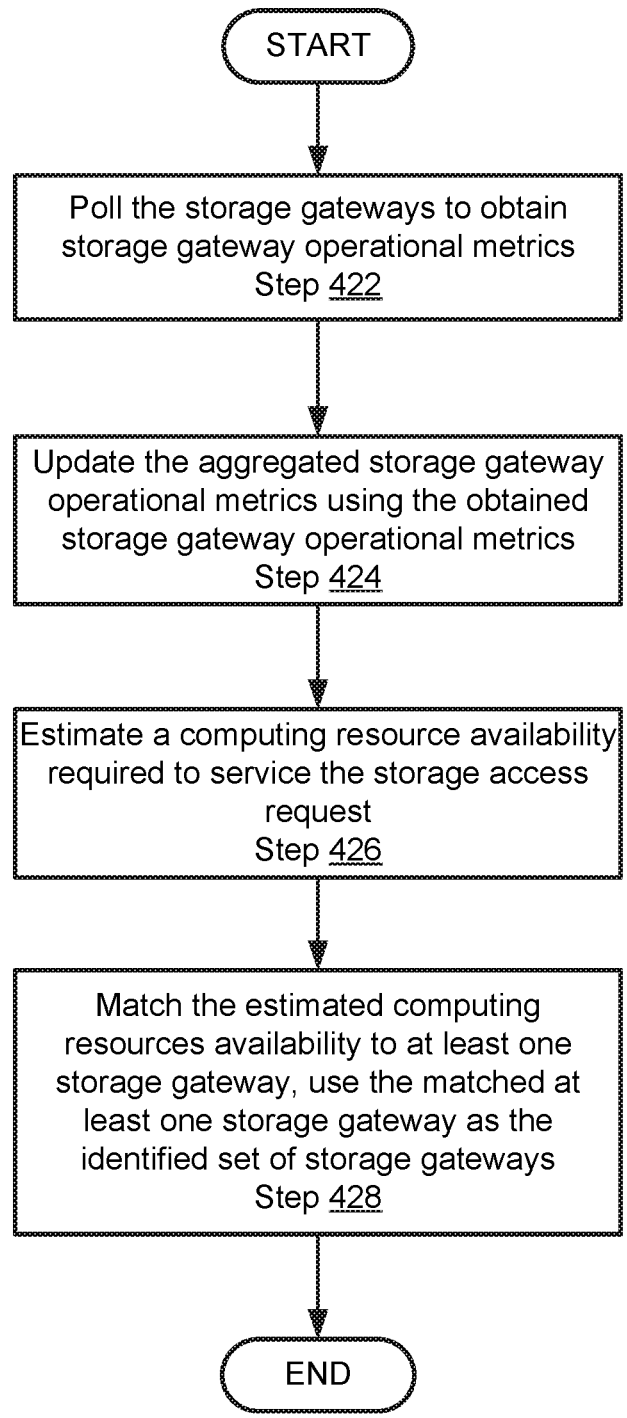
FIG. 4C shows a flowchart of a method of identifying a storage gateway set in accordance with one or more embodiments of the invention.

In one or more embodiments of the invention, the set of storage gateways is identified via the method illustrated in FIG. 4C. The set of storage gateways may be identified using other methods without departing from the invention.

In one or more embodiments of the invention, the set of storage gateways may be identified based on the availability of computing resources of the storage gateways.

In Step 412, a type of workload implicated by the storage access request of Step 400 identified.

In one or more embodiments of the invention, the storage access request specifies the type of workload that will be imposed by assignment of the client to a storage gateway.

In Step 414, a storage gateway of the identified set of storage gateways is selected. In one or more embodiments of the invention, the selection is made arbitrarily.

In Step 416, it is determined whether the selected storage gateway has availability capacity for the identified type of workload.

Figure 4D:
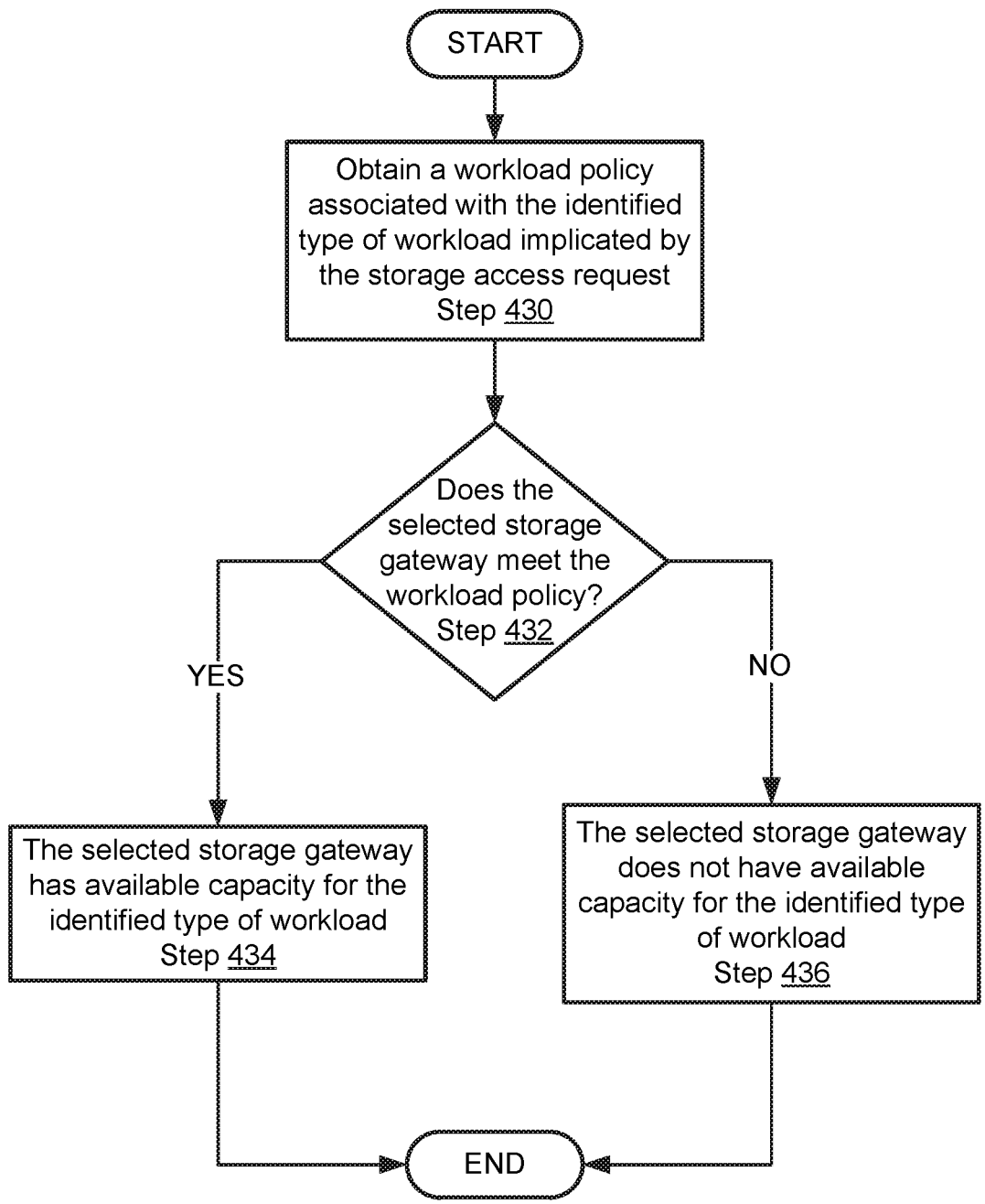
FIG. 4D shows a flowchart of a method of checking capacity in accordance with one or more embodiments of the invention.

In one or more embodiments of the invention, the determination is made using the method illustrated in FIG. 4D. Other methods of making the determination may be used without departing from the invention.

If the storage gateway is determined as having sufficient capacity, the method proceeds to Step 418. If the storage gateway is determined as not having sufficient capacity, the method proceeds to Step 420.

In Step 418, the selected storage gateway is used as the identified storage gateway in Step 402 of FIG. 4A. The method may end following Step 418.

Returning to Step 416, the method proceeds to Step 420 if the selected storage gateway does not have available capacity for the identified type of workload.

In Step 420, the selected storage gateway is removed from the identified set of storage gateways. In other words, if the selected storage gateway does not have available capacity to handle the identified type of workload the selected storage gateway is removed from consideration as a potential servicer of the client.

The method may return to Step 414 following Step 420.

FIG. 4C shows a flowchart of a method in accordance with one or more embodiments of the invention. The method depicted in FIG. 4C may be used to identify a set of storage gateway in accordance with one or more embodiments of the invention. The method shown in FIG. 4C may be performed by, for example, an orchestrator (120, FIG. 1A). Other component of the system illustrated in FIG. 1A may perform the method of FIG. 4C without departing from the invention.

In Step 422, storage gateways are polled to obtain storage gateway operational metrics.

In Step 424, aggregated storage gateway operational metrics are updated using the obtained storage gateway operational metrics.

In Step 426, a computing resource availability required to service the storage access request is estimated.

In one or more embodiments of the invention, the required computing resource availability is estimated based on one or more of: (i) storage capacity of the client, (ii) a function performed by the client, (iii) a frequency of data storage by the client, and (iv) a type of file the client will store using the storage gateway.

In Step 428, the estimated computing resources availability is matched to at least one storage gateway based on the updated aggregated storage gateway operational metrics, use the matched at least one storage gateway as the identified set of storage gateways.

The method may end following Step 428.

FIG. 4D shows a flowchart of a method in accordance with one or more embodiments of the invention. The method depicted in FIG. 4D may be used to determine whether a storage gateway has capacity to service a workload in accordance with one or more embodiments of the invention. The method shown in FIG. 4D may be performed by, for example, an orchestrator (120, FIG. 1A). Other component of the system illustrated in FIG. 1A may perform the method of FIG. 4D without departing from the invention.

In Step 430, a workload policy associated with the identified type of workload implicated by the storage access request is obtained.

In one or more embodiments of the invention, an entry of the obtained workload policy specifies a maximum number of concurrent sessions. The entry matches the workload of the client and the connection characteristics of the storage gateway.

In Step 432, it is determined whether the selected storage gateway meets the workload policy. The selected storage gateway may be the storage gateway selected in Step 414 of FIG. 2B.

In one or more embodiments of the invention, the determination is made by comparing the current number of concurrent sessions performed by the selected storage gateway as specified in the aggregated storage gateway operational metrics to the maximum number of concurrent sessions specified by the matched entry. If the current number of concurrent session is less than the maximum, the selected storage gateway is determined as meeting the workload policy.

If the selected storage gateway meets the workload policy, the method proceeds to Step 434. If the selected storage gateway does not meet the workload policy, the method proceeds to Step 434.

In Step 434, the selected storage gateway is determined as having available capacity for the identified type of workload.

The method may end following Step 434.

In Step 436, the selected storage gateway is determined as not having available capacity for the identified type of workload.

The method may end following Step 436.

Figure 5:
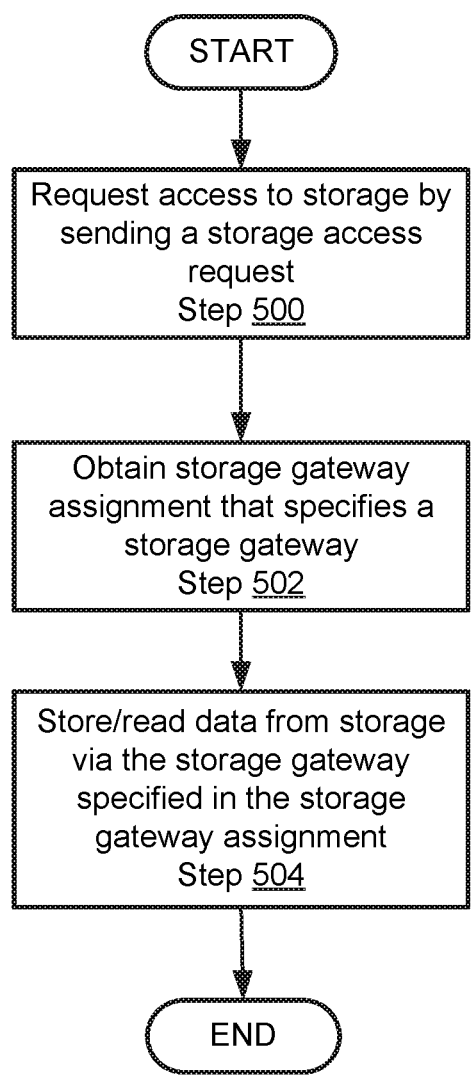
FIG. 5 shows a flowchart of a method of accessing a storage in accordance with one or more embodiments of the invention

As discussed above, the orchestrator (120, FIG. 1A) may assign clients to storage gateways (110, FIG. 1A). FIG. 5 show methods in accordance with one or more embodiments of the invention to that clients may perform to obtain services from the storage gateways. One of ordinary skill will appreciate that some or all of these steps may be executed in different orders, may be combined or omitted, and some or all of the steps may be executed in parallel.

FIG. 5 shows a flowchart of a method in accordance with one or more embodiments of the invention. The method depicted in FIG. 5 may be used to obtain storage services from storage gateways in accordance with one or more embodiments of the invention. The method shown in FIG. 5 may be performed by, for example, a client (100, FIG. 1A). Other component of the system illustrated in FIG. 1A may perform the method of FIG. 5 without departing from the invention.

In Step 500, access to storage is requested by sending a storage access request. In one or more embodiments of the invention, the request is sent to an orchestrator. The request may be sent to other components of the system of FIG. 1A without departing from the invention. In such scenarios, the aforementioned other component may forward the request to an orchestrator.

In one or more embodiments of the invention, the request specifies an identifier of the client and/or a type of workload the client will impose on a storage gateway.

In Step 502, a storage gateway assignment is obtained that specifies a storage gateway. The storage gateway assignment may be obtained from an orchestrator.

In Step 504, data is stored/read from storage via the storage gateway specified in the storage gateway assignment.

The method may end following Step 504.

One or more embodiments of the invention may be implemented using instructions executed by one or more processors of the data management device. Further, such instructions may correspond to computer readable instructions that are stored on one or more non-transitory computer readable mediums.

Figure 6:
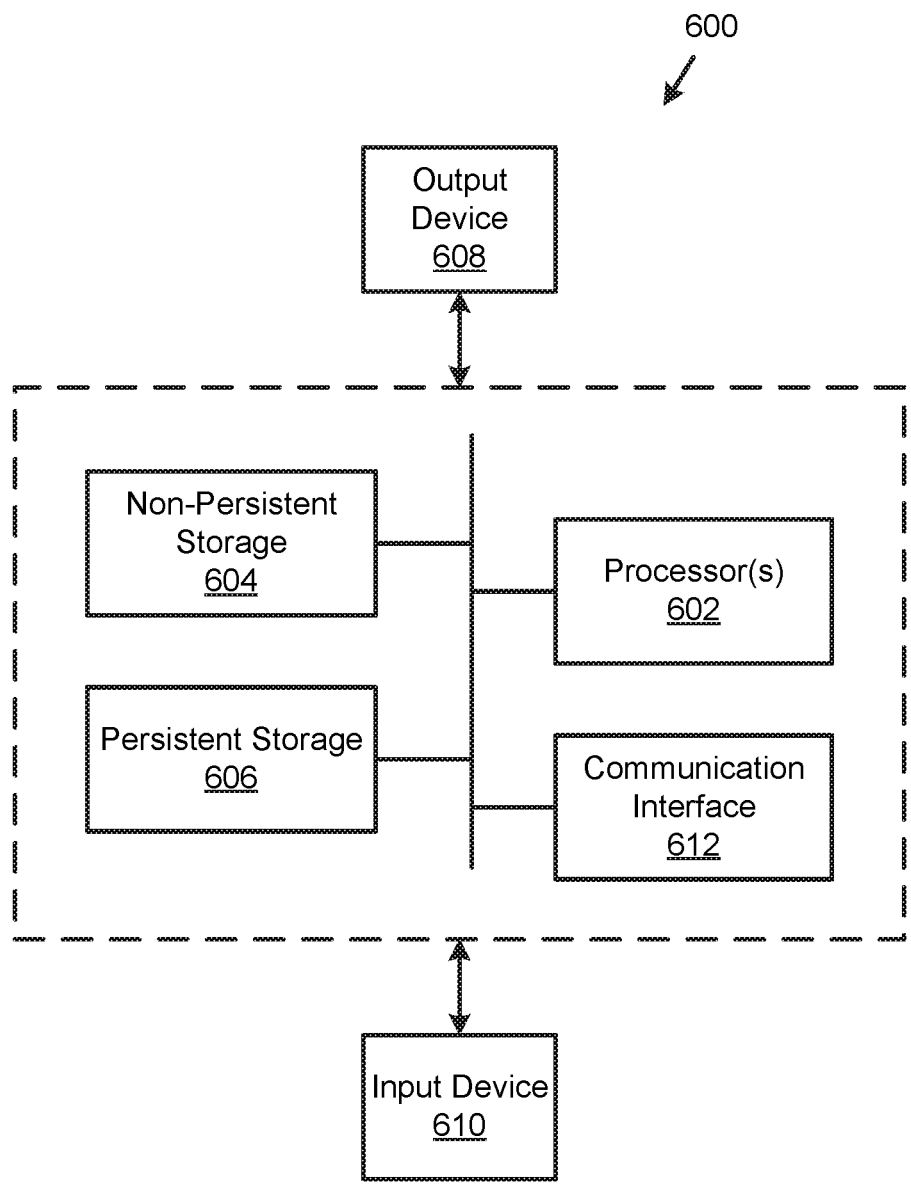
FIG. 6 shows a diagram of a computing device in accordance with one or more embodiments of the invention.

FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may address the problem of reduced quality of service provided by storage gateways in a network environment. The aforementioned problem is uniquely encountered due to the technological environment in which storage gateways operate. Due to the advent of distributed storages, clients frequently store data in storages that are remote such as, for example, a cloud storage. Unlike traditional internal storages, the quality of service provided by remote storages depends on characteristics of the connection between the client and the storage and the type of workload imposed on the storage gateway by the client, in addition to the inherent performance limitations of traditional storages. Embodiments of the invention may take into account these additional quality of service limiting characteristics at the time of assignment and limit the number of concurrent sessions to prevent quality of service reductions. Thus, embodiments of the invention dynamically limit the number of concurrent sessions based on characteristics of the connections and workloads performed by the client. Embodiments of the invention may provide the aforementioned benefit by using a set of rules to determine maximum session concurrencies that will not degrade performance at the time of assignment of clients. The problem discussed above should be understood as being one example of a problem solved by the technology disclosed herein and the invention should not be limited to solving similar problems. The disclosed technology is broadly applicable to address a range of problems.

One or more embodiments of the invention may enable one or more of the following: i) maintain a quality of data storage services provided by a storage gateway by limiting the number of concurrent sessions with clients based on a workload type of each session, ii) reduce the likelihood of data transfer failures from storages to clients due to poor quality of storage service provided by storage gateways, and (iii) reduce the cognitive burden on a user by automatically selecting a storage for storing data without user intervention or feedback.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An orchestrator for providing a client storage access to remote storages via a plurality of storage gateways, comprising:
    a persistent storage comprising a workload policy; and
    a processor programmed to:
        obtain a data storage access request from the client specifying a workload;
        identify a type of the workload indicated by the data storage access request to obtain an identified type of the workload;
        analyzing the plurality of storage gateways to select an identified storage gateway for servicing the data storage access request, wherein the identified storage gateway is selected based on:
            the workload policy,
            the identified type of the workload,
            a mode of the workload, wherein the mode of the workload corresponds to a mode of data storage between the client and the remote storages and is based on a classification of the client from which the data storage access request originated, and
            a classification of a file that will be stored in the identified storage gateway as part of the workload; and
        assign the identified storage gateway to provide the client with storage access to the remote storages.

2. The orchestrator of claim 1, wherein the workload policy comprises a set of rules that specify an availability of each storage gateway of the plurality of storage gateways to service the data storage access request based on:
    the type of the workload, and
    a number of concurrent sessions of the type of the workload serviced by the respective storage gateway of the plurality of storage gateways.

3. The orchestrator of claim 2, wherein the type of workload specifies a database type used by a storage among the remote storages to which the storage access is provided.

4. The orchestrator of claim 1, wherein analyzing the plurality of storage gateways to obtain the identified storage gateway comprises:
    selecting a storage gateway of the plurality of storage gateways that has available computing resources sufficient to service the data storage request;
    making a comparison of a number of concurrent sessions of the identified type of the workload of the selected storage gateway to the workload policy; and
    making a determination, based on the comparison, that the number of concurrent sessions exceeds a maximum number of concurrent sessions of the identified type specified by the workload policy while the selected storage gateway of the plurality of storage gateways has available computing resources sufficient to service the data storage request; and
    in response to the determination, using a different storage gateway from that of the selected storage gateway as the identified storage gateway.

5. The orchestrator of claim 4, wherein analyzing the plurality of storage gateways to obtain the identified storage gateway further comprises:
    selecting a second storage gateway of the plurality of storage gateways that has available computing resources sufficient to service the data storage request;
    making a second comparison of a number of concurrent sessions of the identified type of the workload of the selected second storage gateway to the workload policy;
    making a second determination, based on the comparison, that the number of concurrent sessions is less than the maximum number of concurrent sessions of the identified type specified by the workload policy while the selected storage gateway of the plurality of storage gateways has available computing resources sufficient to service the data storage request; and
    in response to the second determination, using the second storage gateway as the identified storage gateway.

6. The orchestrator of claim 1, wherein the workload policy comprises:
    a first entry that specifies a first maximum number of concurrent sessions for servicing the identified type of workload by the identified storage gateway; and
    a second entry that specifies a second maximum number of concurrent sessions for servicing a second type of workload by the identified storage gateway.

7. The orchestrator of claim 6, wherein the processor is further programmed to:
    obtain a second data storage access request from the client;
    identify a second type of workload indicated by the second data storage access request;
    making a determination, based on the second entry, that servicing the second data storage access request would violate the workload policy,
    in response to the determination, identify a second storage gateway of the plurality of storage gateways to service the second storage access request using the workload policy and the second identified type of workload; and
    assign the identified second storage gateway to provide the client storage access to the remote storages.

8. The orchestrator of claim 1, wherein the identified storage gateway is obtained using a set of rules that directly map the workload policy, the identified type of the workload, the mode of the workload, and the classification of the file that will be stored in the identified storage gateway as part of the workload on the identified storage gateway.

9. The orchestrator of claim 1, wherein the classification of the file specifies whether the file is one or more of a database, unstructured data, and a file system backup.

10. The orchestrator of claim 6, wherein the mode of the workload specifies whether the mode of data storage between the client and the remote storages in a synchronous mode or an asynchronous mode.

11. The orchestrator of claim 10, wherein the synchronous mode indicates that the client will provide changes to the file as the changes occur to the identified storage gateway for storage, wherein the asynchronous mode indicates that the client will not send changes to the file as the changes occur to the identified storage gateway.

12. The orchestrator of claim 6, wherein the first maximum number of concurrent sessions is based on an available cache of the identified storage gateway.

13. The orchestrator of claim 1, wherein the processor is further programmed to:
before obtaining the data storage access request, dynamically modify the workload policy based on a plurality of connections, wherein the plurality of connections are between the identified storage gateway and the remote storages that store data from clients.

14. The orchestrator of claim 13, wherein the workload policy is dynamically modified to adjust a number of concurrent sessions specified by the workload policy proportionally to respective changes in bandwidth of the plurality of connections.

15. The orchestrator of claim 13, wherein the workload policy is dynamically modified to adjust a number of concurrent sessions specified by the workload policy proportionally to respective changes in latency of the plurality of connections.

16. A method of operating an orchestrator for providing a client storage access to remote storages via a plurality of storage gateways, comprising:
obtaining, by the orchestrator, a data storage access request from the client specifying a workload;
identifying, by the orchestrator, a type of the workload indicated by the data storage access request to obtain an identified type of the workload;
analyzing, by the orchestrator, the plurality of storage gateways to select an identified storage gateway for servicing the data storage access request, wherein the identified storage gateway is selected based on:
a workload policy,
the identified type of the workload,
a mode of the workload, wherein the mode of the workload corresponds to a mode of data storage between the client and the remote storages and is based on a classification of the client from which the data storage access request originated, and
a classification of a file that will be stored in the identified storage gateway as part of the workload; and
assigning, by the orchestrator, the identified storage gateway to provide the client with storage access to the remote storages.

17. The method of claim 16, further comprising:
before obtaining the data storage access request, dynamically modify the workload policy based on a plurality of connections, wherein the plurality of connections are between the identified storage gateway and the remote storages that store data from clients.

18. The method of claim 17, wherein the workload policy is dynamically modified to adjust a number of concurrent sessions specified by the workload policy proportionally to respective changes in bandwidth of the plurality of connections.

19. A non-transitory computer readable medium comprising computer readable program code, which when executed by a computer processor enables the computer processor to perform a method for operating an orchestrator for providing a client storage access to remote storages via a plurality of storage gateways, the method comprising:
obtaining, by the orchestrator, a data storage access request from the client specifying a workload;
identifying, by the orchestrator, a type of the workload indicated by the data storage access request to obtain an identified type of the workload;
analyzing, by the orchestrator, the plurality of storage gateways to select an identified storage gateway for servicing the data storage access request, wherein the identified storage gateway is selected based on:
a workload policy,
the identified type of the workload,
a mode of the workload, wherein the mode of the workload corresponds to a mode of data storage between the client and the remote storages and is based on a classification of the client from which the data storage access request originated, and
a classification of a file that will be stored in the identified storage gateway as part of the workload; and
assigning, by the orchestrator, the identified storage gateway to provide the client with storage access to the remote storages.

20. The non-transitory computer readable medium of claim 19, wherein the method further comprises:
before obtaining the data storage access request, dynamically modify the workload policy based on a plurality of connections, wherein the plurality of connections are between the identified storage gateway and the remote storages that store data from clients.

* * * * *